United States Patent
Mansour et al.

(10) Patent No.: US 10,645,705 B1
(45) Date of Patent: May 5, 2020

(54) USE OF SUCCESSIVE INTERFERENCE CANCELLATION AND NON-ORTHOGONAL CODING TO FACILITATE UPLINK COMMUNICATION FROM MULTIPLE DEVICES ON SHARED AIR INTERFACE RESOURCES

(71) Applicant: Sprint Spectrum L.P., Overland Park, KS (US)

(72) Inventors: Nagi Mansour, Arlington, VA (US); Akin Ozozlu, Mclean, VA (US); Noman M. Alam, Chantilly, VA (US); Robert E. Reese, Reston, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 73 days.

(21) Appl. No.: 16/025,588

(22) Filed: Jul. 2, 2018

(51) Int. Cl.
*H04W 72/08* (2009.01)
*H04W 72/04* (2009.01)

(52) U.S. Cl.
CPC ..... *H04W 72/082* (2013.01); *H04W 72/0486* (2013.01)

(58) Field of Classification Search
CPC .................. H04W 72/0486; H04W 72/082
See application file for complete search history.

(56) References Cited

U.S. PATENT DOCUMENTS

| | | | |
|---|---|---|---|
| 8,837,271 B1 | 9/2014 | Mansour et al. | |
| 2002/0058514 A1* | 5/2002 | Senarath | H04W 16/28 455/450 |
| 2004/0023657 A1* | 2/2004 | Lim | H01Q 1/246 455/446 |
| 2004/0264557 A1* | 12/2004 | Maruyama | H04B 1/7107 375/148 |
| 2005/0271009 A1* | 12/2005 | Shirakabe | H04W 16/10 370/329 |
| 2006/0233138 A1* | 10/2006 | Park | H04W 4/021 370/332 |
| 2007/0064651 A1* | 3/2007 | Kim | H04W 36/18 370/331 |
| 2008/0080472 A1* | 4/2008 | Bertrand | H04J 11/005 370/344 |
| 2008/0268782 A1* | 10/2008 | Dateki | H04L 1/0029 455/62 |

(Continued)

OTHER PUBLICATIONS

Adria Yebenes Creus, "Multi-user MIMO Transmission in LTE Uplink," Summer Semester 2015, printed from the World Wide Web, https://publik.tuwien.ac.at/files/PubDat_239523.pdf.

(Continued)

*Primary Examiner* — Jenee Holland

(57) ABSTRACT

A mechanism to help facilitate uplink communication from multiple user equipment devices (UEs) to a base station on shared air interface resources, i.e., with the multiple UEs transmitting to the base station on the same subcarriers and at the same time as each other. The mechanism makes use of successive interference cancellation (SIC) and non-orthogonal coding to help distinguish and separate the UEs' transmissions from each other and thus to help the base station separately process each UE's transmission even though the UEs transmit to the base station on the same air interface resources as each other.

20 Claims, 3 Drawing Sheets

(56) References Cited

U.S. PATENT DOCUMENTS

| | | | |
|---|---|---|---|
| 2009/0003257 A1* | 1/2009 | Kumar | H04L 1/08 370/314 |
| 2009/0074033 A1* | 3/2009 | Kattwinkel | H04B 1/7143 375/132 |
| 2009/0213811 A1* | 8/2009 | Wang | H04W 36/0011 370/331 |
| 2009/0312042 A1* | 12/2009 | Rudrapatna | H04B 1/126 455/501 |
| 2010/0144338 A1* | 6/2010 | Kim | H04W 52/16 455/422.1 |
| 2010/0255867 A1* | 10/2010 | Ishii | H04J 11/0023 455/501 |
| 2010/0317359 A1* | 12/2010 | Suga | H04L 5/0044 455/450 |
| 2011/0045831 A1* | 2/2011 | Chiu | H04W 72/082 455/436 |
| 2011/0047029 A1* | 2/2011 | Nair | H04W 36/00835 705/14.52 |
| 2011/0207487 A1* | 8/2011 | Yang | H04W 4/18 455/507 |
| 2012/0224541 A1* | 9/2012 | Yoshiuchi | H04W 16/10 370/329 |
| 2012/0289231 A1* | 11/2012 | Balachandran | H04W 36/0083 455/436 |
| 2012/0315894 A1* | 12/2012 | Dussmann | H04B 7/15535 455/424 |
| 2013/0069865 A1* | 3/2013 | Hart | H02G 11/00 345/156 |
| 2013/0315328 A1* | 11/2013 | Liu | H04B 7/0413 375/267 |
| 2014/0004897 A1* | 1/2014 | Jung | H04W 72/082 455/509 |
| 2014/0098670 A1* | 4/2014 | Choi | H04L 5/00 370/235 |
| 2014/0153478 A1* | 6/2014 | Kazmi | H04B 7/15542 370/315 |
| 2014/0226503 A1* | 8/2014 | Cooper | G01S 5/0252 370/252 |
| 2015/0092685 A1* | 4/2015 | Lee | H04L 5/0051 370/329 |
| 2015/0156786 A1* | 6/2015 | Kim | H04B 7/0452 370/329 |
| 2016/0019784 A1* | 1/2016 | Peri | G08G 1/08 340/917 |
| 2016/0028350 A1 | 1/2016 | Turner et al. | |
| 2016/0066236 A1* | 3/2016 | Comstock | H04W 52/0254 370/331 |
| 2016/0081106 A1* | 3/2016 | Zhou | H04W 74/0816 370/328 |
| 2016/0198459 A1* | 7/2016 | Noh | H04L 25/0202 370/329 |
| 2016/0381569 A1* | 12/2016 | Wang | H04W 16/28 370/338 |
| 2017/0202029 A1* | 7/2017 | Qi | H04W 76/10 |
| 2017/0222835 A1* | 8/2017 | Kao | H04L 25/0228 |
| 2019/0058558 A1* | 2/2019 | Lee | H04W 56/001 |
| 2019/0222255 A1* | 7/2019 | Nammi | H04B 1/713 |
| 2019/0260418 A1* | 8/2019 | Park | H04J 13/0062 |
| 2019/0312671 A1* | 10/2019 | Lin | H04L 5/026 |

OTHER PUBLICATIONS

Lukas Nagel, et al., "Efficient Multi-User MIMO Transmissions in the LTE-A Uplink," Jul. 2016.

* cited by examiner

USE OF SUCCESSIVE INTERFERENCE CANCELLATION AND NON-ORTHOGONAL CODING TO FACILITATE UPLINK COMMUNICATION FROM MULTIPLE DEVICES ON SHARED AIR INTERFACE RESOURCES

BACKGROUND

In a wireless communication system, a base station or other access node, referred to without limitation as a Node-B (NB), provides a coverage area in which the NB can serve user equipment devices (UEs), such as cell phones, tablet computers, machine-type-communication devices, tracking devices, embedded wireless modules, and/or other wirelessly-equipped communication devices (whether or not user operated). Further, the NB could be coupled with a core network that provides connectivity with various application servers and/or transport networks. With this arrangement, a UE within coverage of the NB could engage in air interface communication with the NB and could thereby communicate via the NB with various application servers and other entities.

Such a network could operate in accordance with a particular air interface protocol (or radio access technology), with communications from the NBs to UEs defining a downlink or forward link and communications from the UEs to the NBs defining an uplink or reverse link.

In accordance with the air interface protocol, each coverage area could operate on a carrier, which could be frequency division duplex (FDD), defining separate frequency channels for downlink and uplink communication, or time division duplex (TDD), with a single frequency channel multiplexed over time between downlink and uplink use. Further, on the downlink and uplink respectively, the air interface could be structured to define physical air interface resources for carrying information between the NB and UEs. For example, the air interface could be divided over time into frames, with each frame being divided in turn into subframes and timeslots, and the carrier bandwidth could be divided over frequency into subcarriers, which could be grouped within each timeslot to define physical resource blocks (PRBs) in which the subcarriers can be modulated to carry data.

Over the years, the industry has embraced various generations of air interface protocols, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

OVERVIEW

With 4G, 5G, or other protocols, a goal may be to increase data rate and expand capacity of the air interface by defining multiple separate "layers" that concurrently use the same physical air interface resources as each other.

For instance, MIMO provides for air interface communication concurrently on multiple different radio-frequency (RF) propagation paths, from multiple transmit-antennas on the transmitting side (e.g., at the NB or at one or more UEs) to multiple receive-antennas on the receiving side (e.g., at one or more UEs or at the NB), with each propagation path defining a separate layer. With this arrangement, separate data signals can be transmitted on the same air interface resources as each other (e.g., on the same subcarriers, at the same time) by transmitting each data signal on a separate respective layer.

MIMO can be used in a "single-user MIMO" (SU-MIMO) configuration to increase the data rate of communication to or from a single UE, by multiplexing communications to or from the UE onto multiple separate propagation paths on the same air interface resources as each other. For instance, data to be transmitted from the transmitting end (NB or UE) to the receiving end (UE or NB) can be time-division-multiplexed into multiple data streams, the data streams can be modulated onto the same PRBs as each other, and the modulated data streams can be output onto separate respective antenna ports for transmission on separate respective propagation paths to the receiving end. In theory, SU-MIMO could thus increase the data rate of communication to or from the UE by a multiple equal to the number of propagation paths without requiring additional air interface resources.

Further, MIMO can also be used in a "multi-user MIMO" (MU-MIMO) configuration to increase the data capacity of the air interface by allowing communications to or from multiple UEs to use the same air interface resources as each other. For instance, a NB can modulate data streams destined to each of multiple UEs on the same PRBs as each other and can transmit the modulated data streams on a separate respective propagation paths for receipt by the UEs. Likewise, multiple UEs can each modulate data on the same PRBs as each other and can each transmit the modulated data streams on a separate respective propagation path for receipt by the NB. In theory, MU-MIMO could thus increase the data capacity of the air interface by allowing a NB to serve more UEs at a time without requiring additional air interface resources.

MIMO layers could be defined and distinguished from each other in various ways. Using SU-MIMO, the transmitter and receiver could each use two or more antennas, and the receiver could estimate the channel distortion at each of its antennas and use the estimates to separately compute and thus uncover each transmit signal. Using MU-MIMO, the NB could use two or more antennas, each UE would use at least one antenna, and channel estimates could similarly be used to distinguish each transmit signal. For instance, on the downlink, the NB could pre-code transmissions on each propagation path using weighted coefficients based on channel estimates from the UEs, in a manner that enables each UE to remove cross-talk and receive its intended data. And on the uplink, the NB could use channel estimates from UEs to similarly remove cross-talk and extract individual UEs' respective transmissions.

While MIMO provides one mechanism to help increase data rate or data capacity, still further improvement could be useful, especially as the industry moves to support IoT and other technologies with increased numbers of UEs.

Disclosed herein is a mechanism to help facilitate uplink communication from multiple user equipment devices (UEs) to a NB on shared air interface resources, i.e., with the multiple UEs transmitting to the NB on the same subcarriers and at the same time as each other. Per the disclosure, the mechanism makes use of successive interference cancellation (SIC) and non-orthogonal coding to help distinguish and separate the UEs' transmissions from each other and thus to help the NB separately process each UE's transmission even though the UEs transmit to the NB on the same air interface resources as each other.

In one respect, disclosed is a method to facilitate uplink communication by at least two UEs on shared air interface resources, e.g., on the same subcarriers at the same time, where a NB serves the two UEs. Per the method, the NB selects first and second UEs to engage in uplink transmission on the same air interface resources as each other, with the selecting being based on the first and second UEs having threshold different uplink receive signal strengths than each other, and where the first UE transmits first data and the second UE transmits second data. Further, the first and second UEs encode their uplink data with non-orthogonal codes, including the first UE encoding the first data with a first code to produce first encoded data, the second UE encoding the second data with a second code to produce second encoded data, and the first and second codes being non-orthogonal to each other, and the first and second UEs transmit their respectively encoded data on the shared air interface resources. The NB thus receives on the shared air interface resources a combination of the first and second encoded data, and the NB then separately uncovers from the combination the first data and the second data by applying SIC and by applying the first and second non-orthogonal codes.

In another respect, disclosed is a base station (e.g., NB) that has (i) a wireless communication interface including an antenna structure and transceiver cooperatively configured to transmit and receive over an air interface defining air interface resources, and (ii) a controller, such as a processing unit, non-transitory data storage, and program instructions stored in the non-transitory data storage and executable by the processor to cause the base station to carry out operations such as those noted above.

In yet another respect, disclosed is a non-transitory computer readable medium encoded with program instructions executable by a processing unit to cause a base station to carry out operations like those noted above.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

The present disclosure will focus on example implementation in the context of LTE. However, it should be understood that the principles described can be extended to implementation in the context of other air interface protocols as well. Further, even within the context described, it should be understood that numerous variations are possible. For instance, features such as structural components and operations could be combined, distributed, removed, reordered or otherwise modified. In addition, it should be understood that operations described as being carried out by one or more entities could be carried out or for the entities, such as by the entities implementing programmed processing units or other hardware.

As noted above, the techniques described could help facilitate uplink communication from multiple UEs to a NB on shared air interface resources, i.e., with the multiple UEs transmitting to the NB on the same subcarriers and at the same time as each other. In particular, the techniques make use of SIC and non-orthogonal coding to help distinguish the UEs' transmissions from each other and thus to help the NB separately process each UE's transmission even though the UEs transmit to the NB on the same air interface resources as each other.

Figure 1:
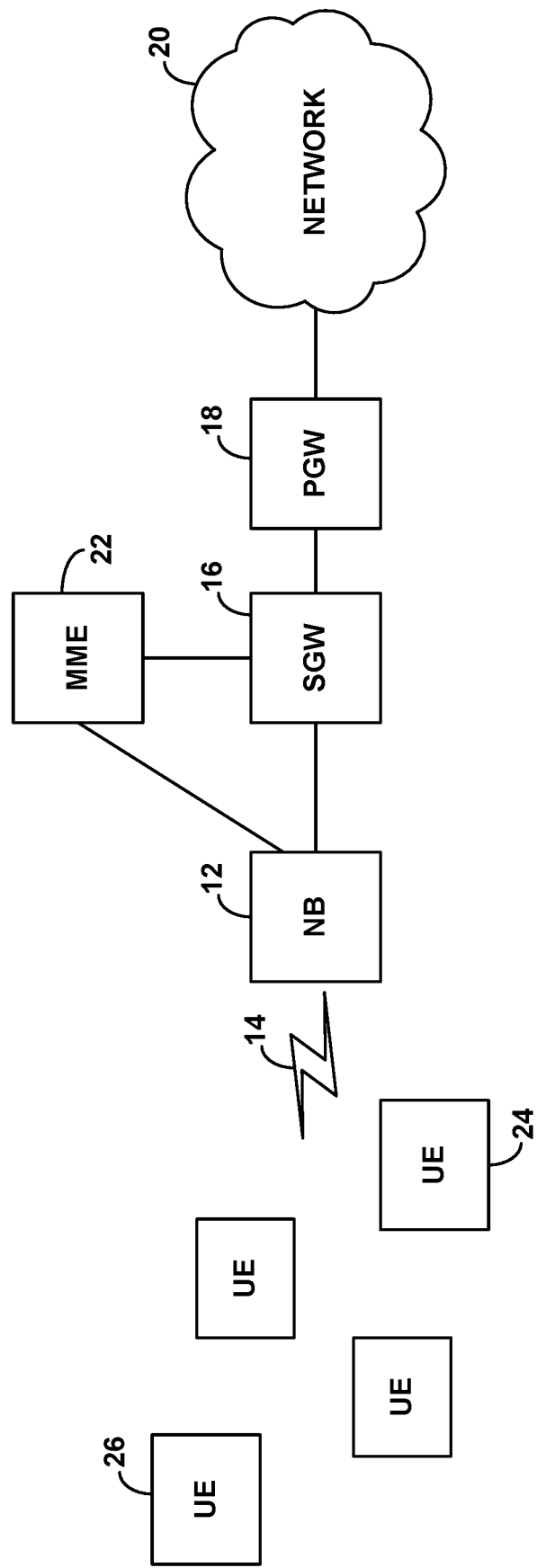
FIG. 1 is a simplified block diagram of an example network arrangement in which aspects of the present disclosure can be implemented.

FIG. 1 is a simplified block diagram of an example network in which the disclosed features could apply. As shown, the example network includes a NB (e.g., LTE evolved Node-B (eNodeB)) 12, which operates to provide coverage 14 defining an air interface over which to serve UEs. The NB could be a macro NB, small cell NB, or femtocell NB, or could take other forms, in any event including an antenna structure and transceiver cooperatively configured to engage in air interface communication. The NB is interfaced with a serving gateway (SGW) 16, which is interfaced with a packet-data-network gateway (PGW) 18 that provides connectivity with a packet-switched network 20 such as the Internet or perhaps a private network. Further, the NB is interfaced with a mobility management entity (MME) 22, which is also interfaced with the SGW.

The LTE air interface operates on a carrier, which as noted above could be FDD, defining separate frequency channels for downlink and uplink communication, or TDD defining a single frequency channel time division multiplexed between downlink and uplink communication. LTE frequency channels have limited bandwidth (width of frequency spectrum), such as 1.4 MHz, 3 MHz, 5 MHz, 10 MHz, 15 MHz, or 20 MHz, among other possibilities. The frequency channel is then divided into a range of subcarriers, such as 15-kHz carriers for instance.

Further, the LTE air interface is divided over time into transmission time intervals (TTIs) in which the subcarriers can be modulated to carry data communications. In particular, the LTE air interface is divided into a continuum of 10-millisecond frames, and each frame is divided into ten 1-millisecond subframes or TTIs. Further, each TTI is divided into two 0.5-millisecond timeslots. On a TDD carrier, the TTIs per frame are allocated among downlink and uplink communication per TDD configuration, downlink-uplink configuration, or frame configuration. And on an FDD carrier, the downlink and uplink each have all ten TTIs per frame on a respective frequency channel.

In each TTI of the LTE air interface, the carrier bandwidth is then divided into physical resource blocks (PRBs), typically each 180-kHz wide, which the NB can allocate for use to carry communications. Further, certain groups or portions of these PRBs are reserved for special purposes.

For instance, each downlink TTI is divided into a number of symbol time segments, and the first such segments are generally reserved to define a downlink control region for carrying control signaling from the NB to UEs and the remaining segments are generally reserved to define a downlink shared channel region for carrying data in allocated PRBs from the NB to UEs. In addition, portions of the TTIs are set aside for other purposes as well, such as for the NB to broadcast a reference signal that UEs can measure to gauge coverage strength and to broadcast other overhead signaling.

On the other hand, in each uplink TTI, the carrier is divided over frequency into an uplink control region and an uplink shared channel region. In particular, PRBs at the low-frequency end and high-frequency end of each TTI are generally reserved to define an uplink control region for carrying control signaling from UEs to the NB, and the remaining PRBs are generally reserved to define an uplink shared channel for carrying data in allocated PRBs from UEs to the NB.

FIG. 1 depicts several representative UEs being served by NB 12 with the UEs being in various qualities of coverage of the NB. An example UE 24 is shown close to the NB, where the UE 24 likely has very good coverage of the NB and the UE's transmissions to the NB may be relatively strong, with high downlink signal-to-noise ratio (SINR). Further, another example UE 26 is shown far from the NB (e.g., near a cell edge), where the UE 26 likely has relatively poor coverage of the NB and the UE's transmissions to the NB may be relatively weak, with low SINR. Other UEs are then shown in the NB's coverage as well.

In practice, when each UE first powers on or otherwise enters into coverage of the network, the UE could scan for and discover coverage of the NB on a given carrier. The UE could then engage in random-access signaling and Radio Resource Control (RRC) signaling with the NB to establish a radio-link-layer connection over which to communicate with the NB. Further, the UE could engage in attach signaling with the MME, via the NB, to register for service with the network. And the MME could coordinate establishment for the UE of one or more bearers (packet tunnels) extending between the UE and the SGW, including a radio bearer between the UE and the NB and an access bearer between the NB and the PGW via the SGW, to facilitate packet-data communication by the UE on network 20.

The NB could then serve the UE in an RRC connected mode, where the NB coordinates use of PRBs to carry data to and from the UE. For instance, when data arrives over an access bearer for transmission to the UE, the NB could select downlink PRBs to carry the data to the UE, the NB could transmit to the UE a downlink control information (DCI) message specifying the allocated downlink PRBs, and the NB could transmit the data to the UE in the allocated PRBs. And when the UE has data to transmit to the NB, the UE could transmit a scheduling request to the NB, the NB could select uplink PRBs to carry the data from the UE and could transmit to the UE a DCI specifying the allocated uplink PRBs, and the UE could transmit the data to the NB in the allocated PRBs.

When the NB has scheduled transmission to or from a UE, the recipient of that transmission (the UE or the NB) could also provide acknowledgement signaling indicating whether it successfully received the transmission, and if the transmission failed, retransmission could occur. For instance, when the NB receives an uplink transmission from a UE as scheduled, the NB could then compute a cyclic redundancy check (CRC) value based on the data received and determine whether the CRC value matches a CRC value included in the transmission, to determine whether the NB successfully received the intended data. If the NB confirms that it received the data successfully, then the NB could transmit a positive acknowledgement (ACK) to the UE. Whereas, if the NB determines that it did not successfully receive the data, then the NB could transmit a negative acknowledgement (NACK) to the UE, which could trigger retransmission from the UE.

As the NB serves each such UE, the NB may also learn various information related to coverage conditions and transmissions from the UE. For instance, the NB may receive and keep track of periodic reports from the UE indicating the UE's downlink conditions, such as SINR, downlink reference signal strength or quality, power headroom, and other metrics indicative of channel quality. Further, the NB may measure and/or track uplink receive signal strength, retransmission rate, and/or other metrics to evaluate channel quality. Still further, the NB may track or have access to data indicating geolocation of the UE, such as how close or far away the UE is. Other examples are possible as well.

As noted above, the present disclosure provides a mechanism to facilitate uplink communication by multiple served UEs on shared air interface resources. Here, the term "shared air interface resources" is to be distinguished from the "uplink shared channel" discussed above. The uplink shared channel includes a range of PRBs that the NB can allocate among UEs in a given TTI, so that the channel is shared among those UEs. Shared air interface resources, however, are resources that are used to carry transmission from multiple UEs at once. In the context of LTE this would entail two or more UEs transmitting to the NB on the same subcarriers as each other at the same time as each other. For instance, this could entail the NB assigning two or more UEs to transmit data to the NB within the same PRB(s) as each other, with the UEs transmitting concurrently on the same subcarriers as each other within the assigned PRB(s).

Enabling successful communication from multiple UEs on shared air interface resources can be particularly helpful in a heavy load situation, considering the limited extent of uplink air interface resources on the NB's carrier. It may therefore be useful to implement the disclosed features in response to detecting heavy load on the NB's carrier, such as in response to determining (currently or on a time-of-day schedule basis) that the NB is serving a threshold high number of UEs in the RRC connected mode on the carrier, that the percentage of uplink PRBs allocated on the carrier on average over a recent sliding window of time is threshold high, or otherwise in response to detecting heavy load.

As further noted above, the disclosed mechanism relates to use of SIC and non-orthogonal coding, to help distinguish the UEs' transmissions from each other and thus to help the NB separately process each UE's transmission even though the UEs transmit to the NB on the same air interface resources as each other.

To facilitate being able to use SIC in an effort to separate UEs' transmissions that the NB will receive in combination on shared air interface resources, the NB could initially decide to group at least two UEs based on the UEs sufficiently different uplink receive signal strength than each other. For instance, of the various UEs that the NB is serving, the NB could select the UEs to group together for this purpose based on one of the UEs having particularly high receive signal strength at the NB and the other UE having particularly low receive signal strength at the NB.

The NB could measure the UEs' uplink receive signal strengths directly, based on recent transmissions by the UEs (e.g., on non-shared air interface resources). Alternatively, the NB could use one or more proxy metrics to determine that that the receive signal strengths from the UEs are or will be significantly different. For instance, the NB could use downlink SINR values recently reported by the UEs. In particular, the NB could compute a difference between one UE's reported SINR and the other UE's reported SINR and could determine that the computed difference is higher than a predefined threshold indicating that the UEs' respective coverage of the NB differs significantly. This indicated significant difference in coverage could represent a situation where one of the UEs is in very good coverage of the NB (e.g., near the NB) where the NB will likely have relatively high uplink receive signal strength from the UE, and where the other UE is in relatively poor coverage of the NB (e.g., far from the NB) where the NB will likely have relatively low uplink receive signal strength from the other UE. Alternatively, the NB could use geolocations of the UEs as a basis to determine that one is nearby and the other is far away, suggesting similar differences in uplink receive signal strength. Other examples are possible as well.

Pairing the UEs on this basis for uplink transmission on shared air interface resources could enable the NB to efficiently use SIC to separate the UEs transmission from each other. In particular, when the NB receives the combination of their transmissions on the shared air interface resources, the NB could first extract the significantly stronger signal received from one of the UEs, because the signal that the NB receives from the other UE may appear as mere background noise to the stronger received signal. And the NB could then subtract from the combination the extracted signal or its associated radio path information in order to uncover the weaker signal from the other UE. As noted above, the NB could then apply a CRC analysis or the like to determine whether each transmission was successful.

In addition, as noted above, the NB could also use non-orthogonal coding to help distinguish the UEs' respective transmissions from each other. In particular, each UE could encode its intended data transmission by a respective code, with the codes being non-orthogonal to each other but being deemed to have good auto-correlation and cross-correlation properties that would enable the NB to use the codes as a basis to separate the UEs' transmissions from the combination that the NB receives on the shared air interface resources.

While use of orthogonal codes, such as Walsh codes, may more certainly enable the NB to separate the UEs' transmissions from the combined transmission received on the shared air interface resources, there may be a limited supply of orthogonal codes. On the other hand there may be many more available non-orthogonal codes that have good auto and cross correlation properties, which may even make it practical for UEs to randomly select or has to their own non-orthogonal codes in a given implementation. Examples of such codes include Zadoff-Chu sequences and Gold sequences.

In practice, when multiple UEs are going to transmit data on the same air interface resources as each other, each UE could determine a respective code to use for encoding its data before transmission, with the UEs' codes being non-orthogonal to each other but having good auto and cross correlation properties. And the NB would know or become aware of each UE's respective code.

For example, the NB could select a respective code for each UE and could designate the code within the DCI that the NB sends to the UE to schedule transmission by the UE on the shared air interface resources. Alternatively, the UE could randomly select such a code and might transmit an indication of the code to the NB within the UE's scheduling request to the NB. Still alternatively, the UE and NB could each apply a hashing algorithm keyed to the UE's identifier or the like, to establish what code the UE will apply. And yet alternatively, each UE may have a respectively preassigned code for this purpose, which could also be indicated in a UE profile or context record accessible to the NB. Other examples are possible as well.

Each UE could encode its data before transmission by multiplying the data by the UE's respective non-orthogonal code, thereby generating encoded data that the UE will transmit on the shared air interface resources to the NB. For instance, each UE could compute an XOR product of the data and the UE's non-orthogonal code. (For a code of length N bits, the UE could compute the XOR product per N bits of the data to be transmitted.) And each UE could then transmit the encoded data to the NB on the shared air interface resources.

When the NB receives the combination of the UEs' transmissions on the shared air interface resources, the NB could then apply the UEs' respective non-orthogonal codes in an effort to separate the UEs communications. For instance, the NB could multiply the combined signal by one UE's non-orthogonal code in an effort to uncover the underlying data from that UE, and the NB could multiply the combined signal by the other UE's non-orthogonal code in an effort to uncover the underlying data from that other UE. Given sufficient auto-correlation and cross-correlation between the codes, the NB may thereby uncover the UEs' respective transmissions even though the codes are not fully orthogonal to each other, and the NB may separately process the UEs' respective transmissions.

Applying these UE-pairing and coding techniques could help increase the NB's likelihood of successfully separating the UEs' transmissions from the combined signal that the NB receives on the shared air interface resources. By way of example, upon receipt of the combined signal, the NB could sequentially use the two techniques.

In an example implementation, the NB could initially use SIC to separate the UEs' signals into a signal respectively from each UE, and the NB could then apply the UEs' respective non-orthogonal codes to the separated signals in order to uncover each UE's respective underlying data. In that process, the SIC itself may suffice to separate the UEs transmission from the received combination, and the NB could then uncover each underlying set of data. Alternatively, the NB could initially apply the UEs' non-orthogonal codes in an effort to separate the signals in the first place, and if that separation does not work (e.g., if a CRC analysis shows failure of the communication), then the NB could instead apply SIC to separate the signals and then apply the non-orthogonal codes to uncover each UE's respective underlying data. Other procedures could be possible as well.

Figure 2:
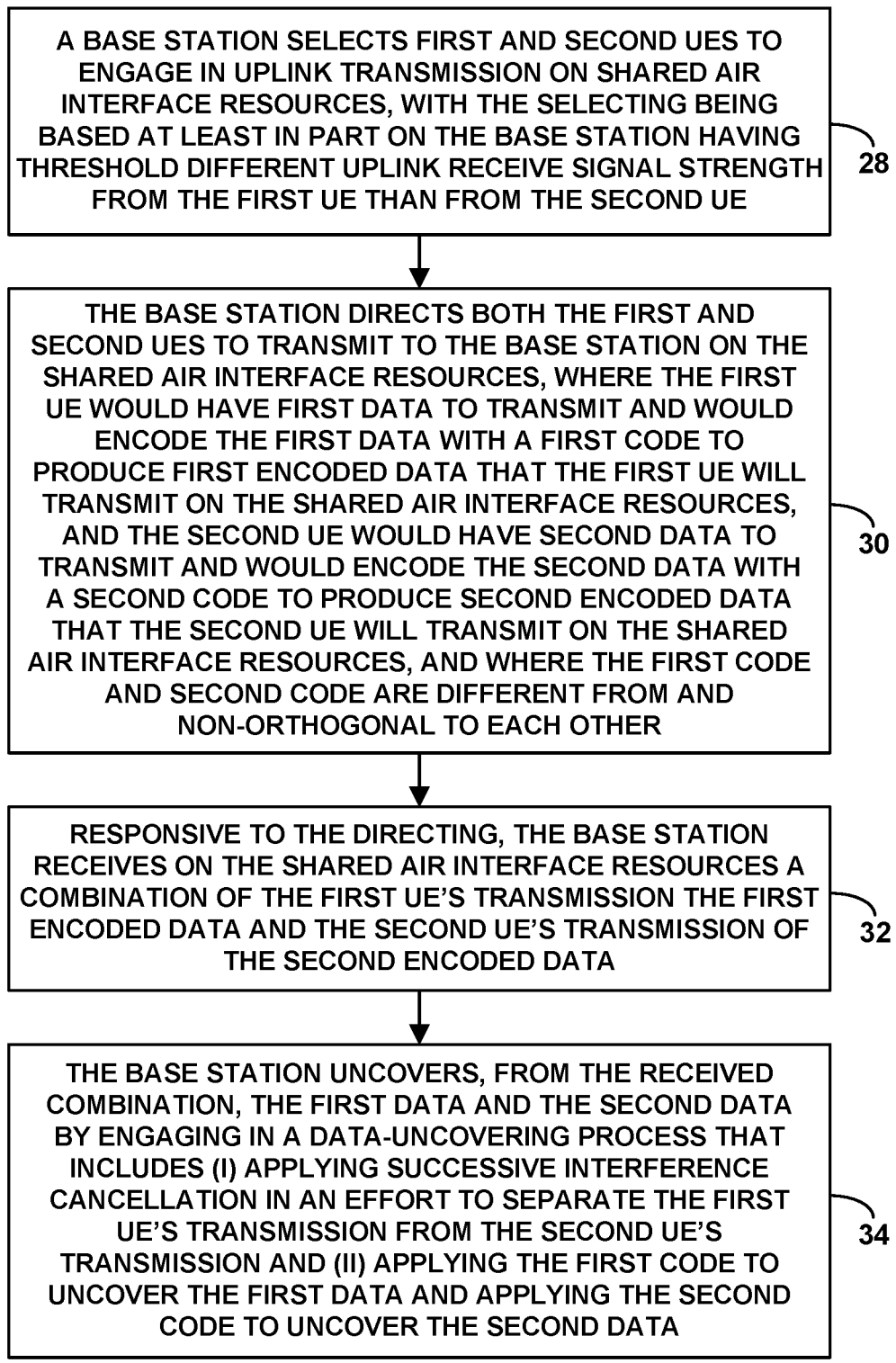
FIG. 2 is a flow chart depicting an example method in accordance with the disclosure.

FIG. 2 is a flow chart depicting a method operable in line with this discussion, to facilitate uplink communication by a first UE and a second UE on shared air interface resources, when a base station serves the first and second UEs on a common carrier. As noted above, this method could be carried out by the base station in response to the base station detecting a predefined threshold high level of load on the carrier (i.e., at least that level of load). Alternatively, the method could be carried out in other scenarios.

As shown in FIG. 2, at block 28, the base station selects the first and second UEs to engage in uplink transmission on the shared air interface resources, with the selecting being based at least in part on the base station having threshold different uplink receive signal strength from the first UE than from the second UE. The base station could be pre-provisioned with a threshold value against which to compare a determined difference between uplink receive signal strengths of the two UEs. Further, the base station could measure uplink receive signal strength from each UE for this purpose. Alternatively, the base station could use various metrics as proxies for actual uplink receive signal strength measurements. For instance, the base station could use SINR reports from the UEs, geolocations of the UEs, or other information that would likely correlate with actual or likely uplink receive signal strength, to facilitate this analysis.

At block 30, the base station then directs both the first and second UEs to transmit to the base station on the shared air interface resources. For instance, the base station could transmit respectively to each UE a DCI message that directs the UE to transmit on the shared air interface resources, such as by directing both UEs to transmit on the same PRBs as each other or otherwise to transmit on the same subcarriers as each other at the same time as each other.

As discussed above, the first UE would have first data to transmit and would encode the first data with a first code to produce first encoded data that the first UE will transmit on the shared air interface resources, and the second UE would have second data to transmit and would encode the second data with a second code to produce second encoded data that the second UE will transmit on the shared air interface resources, the first code and second code being different from and non-orthogonal to each other. For instance, the first and second codes could be Zadoff-Chu sequences, or the first and second codes could be Zadoff-Chu sequences, among other possibilities.

At block 32, responsive to the directing, the base station would then receive on the shared air interface resources a combination of the first UE's transmission the first encoded data and the second UE's transmission of the second encoded data. In particular, the base station would effectively receive one combined signal on the subcarriers on which both the first and second UEs transmitted their respective encoded data.

And at block 34, the base station then uncovers, from the received combination, the first data and the second data by engaging in a data-uncovering process that includes (i) applying successive interference cancellation in an effort to separate the first UE's transmission from the second UE's transmission and (ii) applying the first code to uncover the first data and applying the second code to uncover the second data.

As discussed above, the data-uncovering process could include the base station applying the successive interference cancellation process to separately uncover the first encoded data and the second encoded data, the base station applying the first code to the first encoded data to uncover the first data, and the base station applying the second code to the second encoded data to uncover the second data.

Alternatively, the data-uncovering process could include the base station first applying the successive interference cancellation in an effort to separate the first UE's transmission from the second UE's transmission, and, upon failure of the successive interference cancellation (e.g., as indicated by a CRC analysis), then the base station applying the first code and second code to the combination to separately uncover the first data and second data.

Still alternatively, the data-uncovering process could include the base station first applying the first code and second code to the combination to separately uncover the first data and the second data and, upon failure to uncover the first data and second data by applying the first code and second code to the combination, then the base station (i) applying the successive interference cancellation to separately uncover the first encoded data and the second encoded data, and (ii) applying the first code to the first encoded data to uncover the first data and applying the second code to the second encoded data to uncover the second data.

Further, as discussed above, the base station could select the first code to be applied by the first UE and could direct the first UE to apply the selected first code to the first data, and the base station could likewise select the second code to be applied by the second UE and could direct the second UE to apply the selected second code to the second data.

Figure 3:
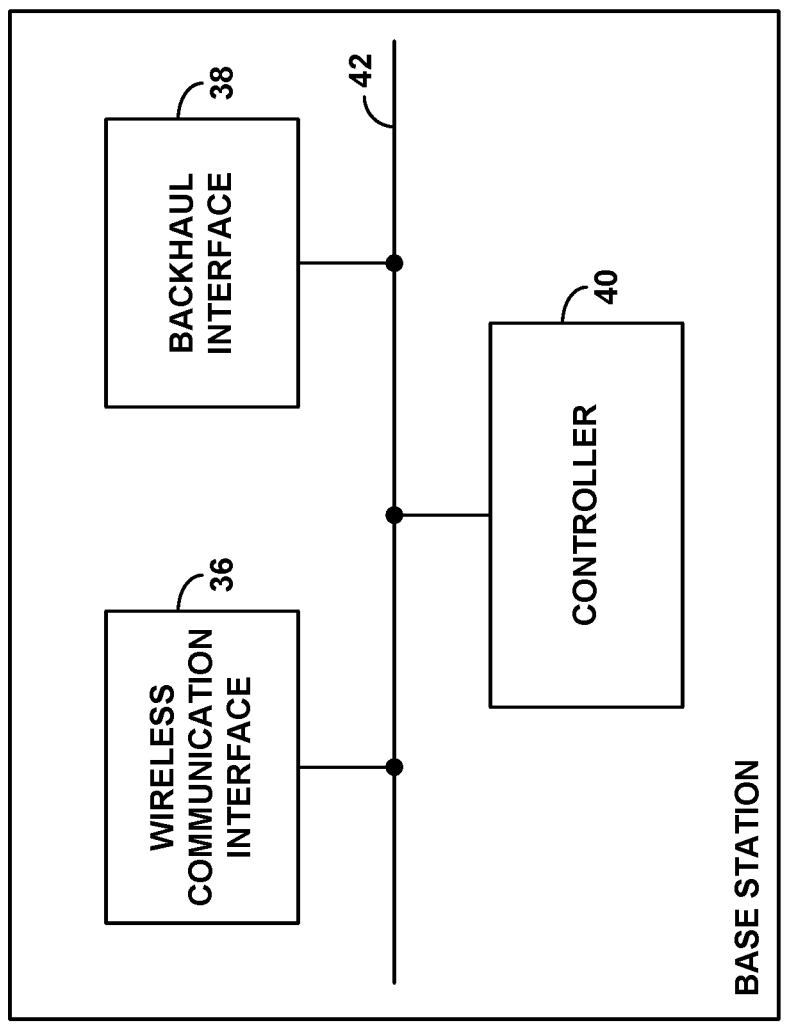
FIG. 3 is a simplified block diagram of a NB operable in accordance with the disclosure.

FIG. 3 is next a simplified block diagram of an example base station (e.g., NB) operable in accordance with the present disclosure. As shown in FIG. 3, the example base station includes a wireless communication interface 36, a backhaul interface 38, and a controller 40, all of which could be communicatively linked together by a system bus, network, or other connection mechanism 42.

The wireless communication interface 36 could be configured to provide cellular coverage and to engage in air interface communication with served UEs. As such, wireless communication interface 36 could comprise an antenna structure (e.g., a MIMO antenna array or other type of antenna), which could be tower mounted or could take other forms, and associated components such as a power amplifier, a low noise amplifier, and a wireless transceiver, so as to facilitate providing a coverage area defining an air interface having a downlink and an uplink, and engaging in transmission and reception as discussed above. Further, backhaul interface 38 could comprise a wired or wireless interface, such as an Ethernet network communication interface, configured to support communication with other entities, such as with the SGW and MME discussed above.

Controller 40 could then comprise control logic to cause the base station to carry out particular operations including those discussed above. As such, the controller 40 could take various forms, including but not limited to a processing unit including one or more processors (e.g., general purpose microprocessors and/or dedicated processing units) and data storage (e.g., one or more volatile and/or non-volatile storage components, such as magnetic, optical, or flash storage) holding program instructions executable by the processing unit to cause the base station to carry out various operations described herein. The present disclosure also contemplates a non-transitory computer readable medium having encoded thereon program instructions executable to carry out such operations.

Exemplary embodiments have been described above. Those skilled in the art will understand, however, that changes and modifications may be made to these embodiments without departing from the true scope and spirit of the invention.

We claim:

1. A method to facilitate uplink communication by a first user equipment device (UE) and a second UE on shared air interface resources, wherein a base station serves the first and second UEs on a common carrier, the method comprising:

selecting by the base station the first and second UEs to engage in uplink transmission on the shared air interface resources, wherein the selecting is based at least in part on the base station having threshold different uplink receive signal strength from the first UE than from the second UE;

directing by the base station both the first and second UEs to transmit to the base station on the shared air interface resources, wherein the first UE has first data to transmit and encodes the first data with a first code to produce first encoded data that the first UE will transmit on the shared air interface resources, and wherein the second UE has second data to transmit and encodes the second data with a second code to produce second encoded data that the second UE will transmit on the shared air interface resources, the first code and second code being different from and non-orthogonal to each other;

responsive to the directing, receiving by the base station on the shared air interface resources a combination of a transmission from the first UE of the first encoded data and a transmission from the second UE of the second encoded data; and uncovering by the base station, from the received combination, the first data and the second data by a data-uncovering process including (i) applying successive interference cancellation in an effort to separate the first UE's transmission from the second UE's transmission and (ii) applying the first code to uncover the first data and applying the second code to uncover the second data.

2. The method of claim 1, carried out by the base station in response to detecting a predefined threshold high level of load on the common carrier.

3. The method of claim 1, wherein the data-uncovering process includes first applying the successive interference cancellation process to separately uncover the first encoded data and the second encoded data, applying the first code to the first encoded data to uncover the first data, and applying the second code to the second encoded data to uncover the second data.

4. The method of claim 1, wherein the data-uncovering process includes applying the successive interference cancellation in an effort to separate the transmission from the first UE from the transmission from the second UE, and, upon failure of the successive interference cancellation, then applying the first code and second code to the combination to separately uncover the first data and second data.

5. The method of claim 1, wherein the data-uncovering process includes first applying the first code and second code to the combination to separately uncover the first data and the second data and, upon failure to uncover the first data and second data by applying the first code and second code to the combination, then (i) applying the successive interference cancellation to separately uncover the first encoded data and the second encoded data, and (ii) applying the first code to the first encoded data to uncover the first data and applying the second code to the second encoded data to uncover the second data.

6. The method of claim 1, wherein each of the first code and second code is a Zadoff-Chu sequence or each of the first code and second code is a Gold sequence.

7. The method of claim 1, further comprising selecting by the base station the first code to be applied by the first UE and directing the first UE to apply the selected first code to the first data, and selecting by the base station the second code to be applied by the second UE and directing the second UE to apply the selected second code to the second data.

8. The method of claim 1, wherein the shared air interface resources are particular subcarriers and time, wherein the first UE and second UE transmitting on the shared air interface resources comprises the first UE and second UE each transmitting on the same subcarriers as each other at the same time as each other.

9. The method of claim 1, wherein selecting the first UE and second UE based at least in part on the base station having threshold different uplink receive signal strength from the first UE than from the second UE comprises selecting the first UE and second UE based at least in part on the first UE and second UE having threshold different reported downlink signal-to-noise ratios (SINRs) than each other.

10. A base station comprising:

an antenna structure operable to wirelessly transmit and receive;

a controller configured to enable uplink communication from a first user equipment device (UE) and a second UE on shared air interface resources when the base station serves the first and second UEs on a common carrier, wherein the controller is configured to select the first and second UEs to engage in uplink transmission on the shared air interface resources, wherein the selecting is based at least in part on the base station having threshold different uplink receive signal strength from the first UE than from the second UE, wherein the controller is configured to direct both the first and second UEs to transmit to the base station on the shared air interface resources, wherein the first UE has first data to transmit and encodes the first data with a first code to produce first encoded data that the first UE will transmit on the shared air interface resources, and wherein the second UE has second data to transmit and encodes the second data with a second code to produce second encoded data that the second UE will transmit on the shared air interface resources, the first code and second code being different from and non-orthogonal to each other, and wherein, responsive to the directing, the base station receives on the shared air interface resources a combination of a transmission from the first UE of the first encoded data and a transmission from the second UE of the second encoded data, and wherein the controller is configured to uncover, from the received combination, the first data and the second data by a data-uncovering process including (i) applying successive interference cancellation in an effort to separate the transmission from the first UE from the transmission from the second UE and (ii) applying the first code to uncover the first data and applying the second code to uncover the second data.

11. The base station of claim 10, wherein the data-uncovering process includes first applying the successive interference cancellation process to separately uncover the first encoded data and the second encoded data, applying the first code to the first encoded data to uncover the first data, and applying the second code to the second encoded data to uncover the second data.

12. The base station of claim 10, wherein the data-uncovering process includes first applying the successive interference cancellation in an effort to separate the transmission from the first UE from the transmission from the second UE, and, upon failure of the successive interference cancellation, then applying the first code and second code to the combination to separately uncover the first data and second data.

13. The base station of claim 10, wherein the data-uncovering process includes first applying the first code and second code to the combination to separately uncover the first data and the second data and, upon failure to uncover the first data and second data by applying the first code and second code to the combination, then (i) applying the successive interference cancellation to separately uncover the first encoded data and the second encoded data, and (ii) applying the first code to the first encoded data to uncover the first data and applying the second code to the second encoded data to uncover the second data.

14. The base station of claim 10, wherein each of the first code and second code is a Zadoff-Chu sequence or each of the first code and second code is a Gold sequence.

15. The base station of claim 10, wherein the shared air interface resources are particular subcarriers and time, wherein the first UE and second UE transmitting on the shared air interface resources comprises the first UE and second UE each transmitting on the same subcarriers as each other at the same time as each other.

16. The base station of claim 10, wherein selecting the first UE and second UE based at least in part on the base station having threshold different uplink receive signal strength from the first UE than from the second UE comprises selecting the first UE and second UE based at least in part on the first UE and second UE having threshold different reported downlink signal-to-noise ratios (SINRs) than each other.

17. The base station of claim 10, wherein the controller comprises a processing unit, non-transitory data storage, and program instructions stored in the data storage and executable by the processing unit.

18. A non-transitory computer readable medium having stored thereon instructions executable by a processing unit to carry out operations to enable uplink communication from a first user equipment device (UE) and a second UE on shared air interface resources when a base station serves the first and second UEs on a common carrier, the operations comprising:

selecting the first and second UEs to engage in uplink transmission on the shared air interface resources, wherein the selecting is based at least in part on the base station having threshold different uplink receive signal strength from the first UE than from the second UE;

directing both the first and second UEs to transmit to the base station on the shared air interface resources, wherein the first UE has first data to transmit and encodes the first data with a first code to produce first encoded data that the first UE will transmit on the shared air interface resources, and wherein the second UE has second data to transmit and encodes the second data with a second code to produce second encoded data that the second UE will transmit on the shared air interface resources, the first code and second code being different from and non-orthogonal to each other, wherein, responsive to the directing, the base station receives on the shared air interface resources a combination of a transmission from the first UE of the first encoded data and a transmission from the second UE of the second encoded data; and uncovering, from the received combination, the first data and the second data by a data-uncovering process including (i) applying successive interference cancellation in an effort to separate the transmission from the first UE from the transmission from the second UE and (ii) applying the first code to uncover the first data and applying the second code to uncover the second data.

19. The non-transitory computer readable medium of claim 18, wherein each of the first code and second code is a Zadoff-Chu sequence or each of the first code and second code is a Gold sequence.

20. The non-transitory computer readable medium of claim 18, wherein the shared air interface resources are particular subcarriers and time, wherein the first UE and second UE transmitting on the shared air interface resources comprises the first UE and second UE each transmitting on the same subcarriers as each other at the same time as each other.

* * * * *